No. 856,980. PATENTED JUNE 11, 1907.
G. F. MYERS.
COKE WORKING APPARATUS.
APPLICATION FILED JULY 23, 1903.

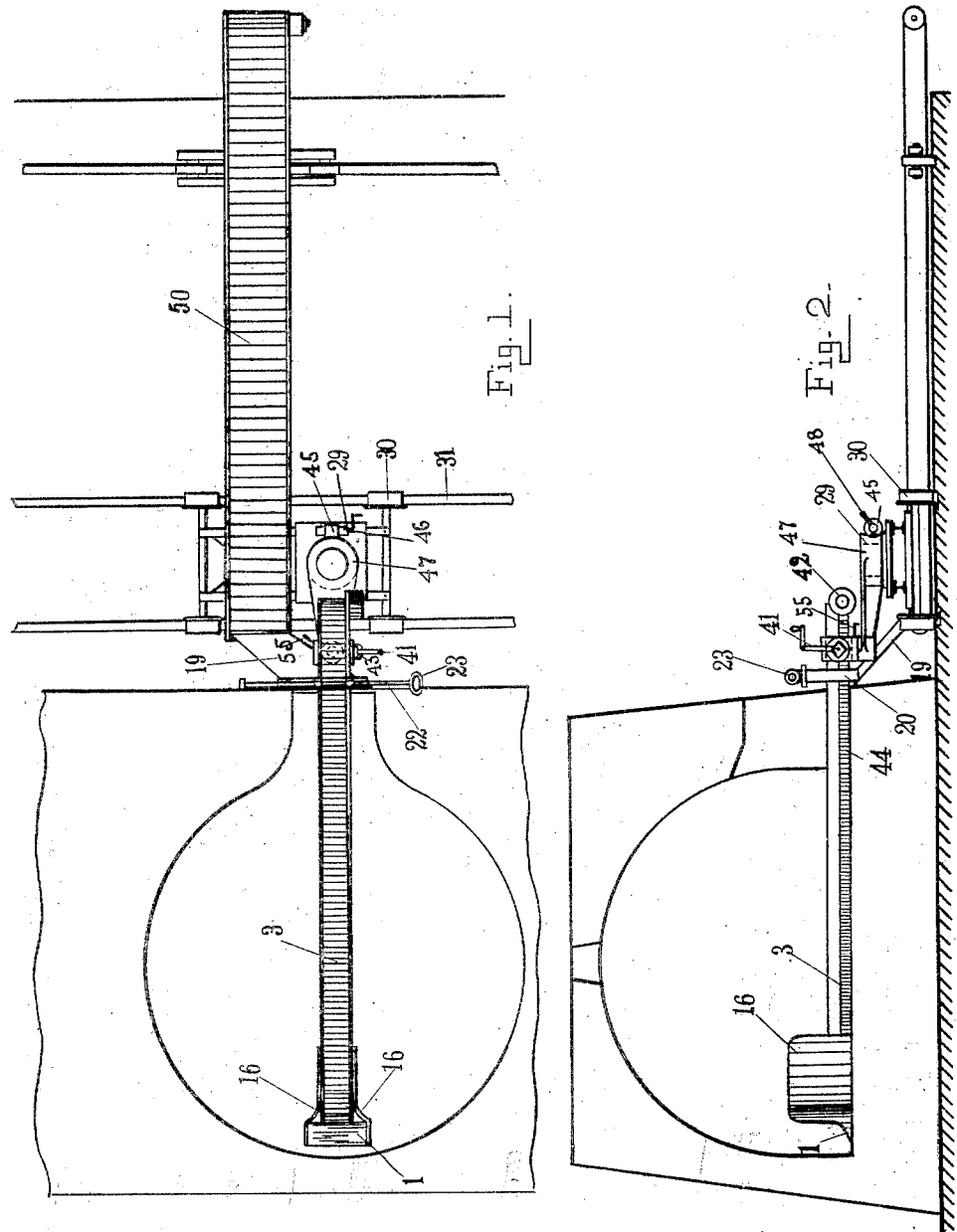

9 SHEETS—SHEET 2.

WITNESSES
B. E. Lying
B. B. Miller.

INVENTOR
George Francis Myers.

No. 856,980. PATENTED JUNE 11, 1907.
G. F. MYERS.
COKE WORKING APPARATUS.
APPLICATION FILED JULY 23, 1903.

9 SHEETS—SHEET 3.

WITNESSES
INVENTOR

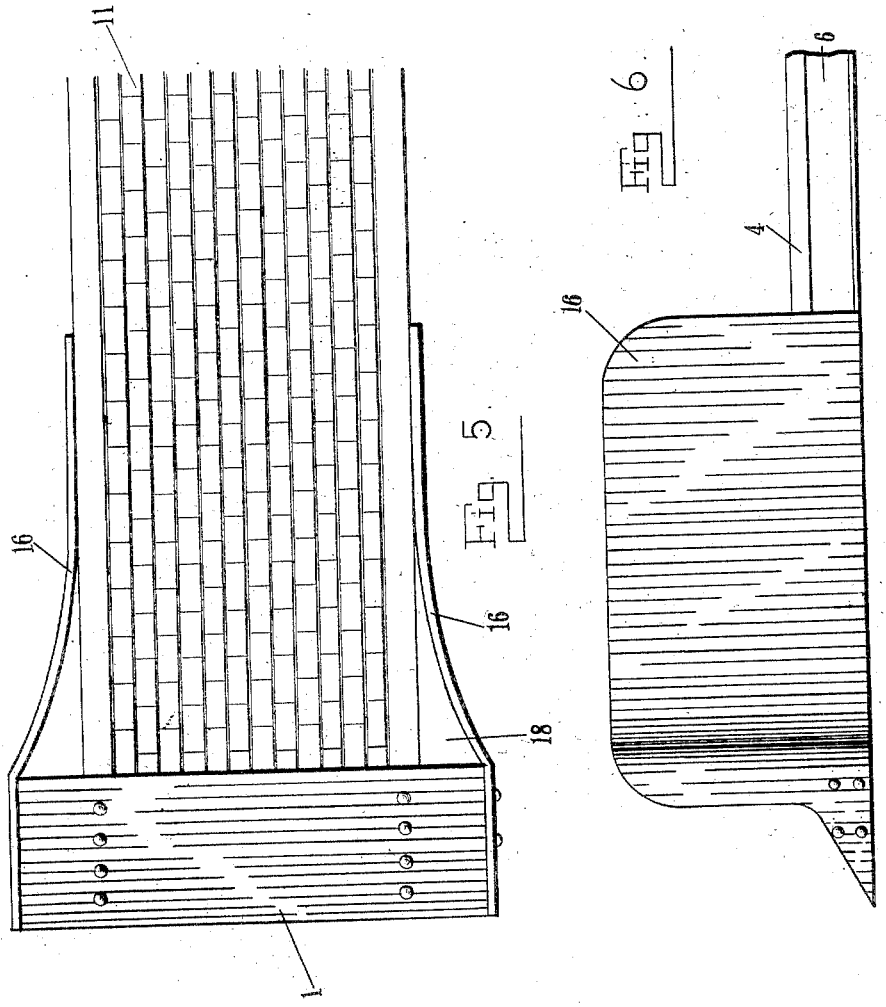

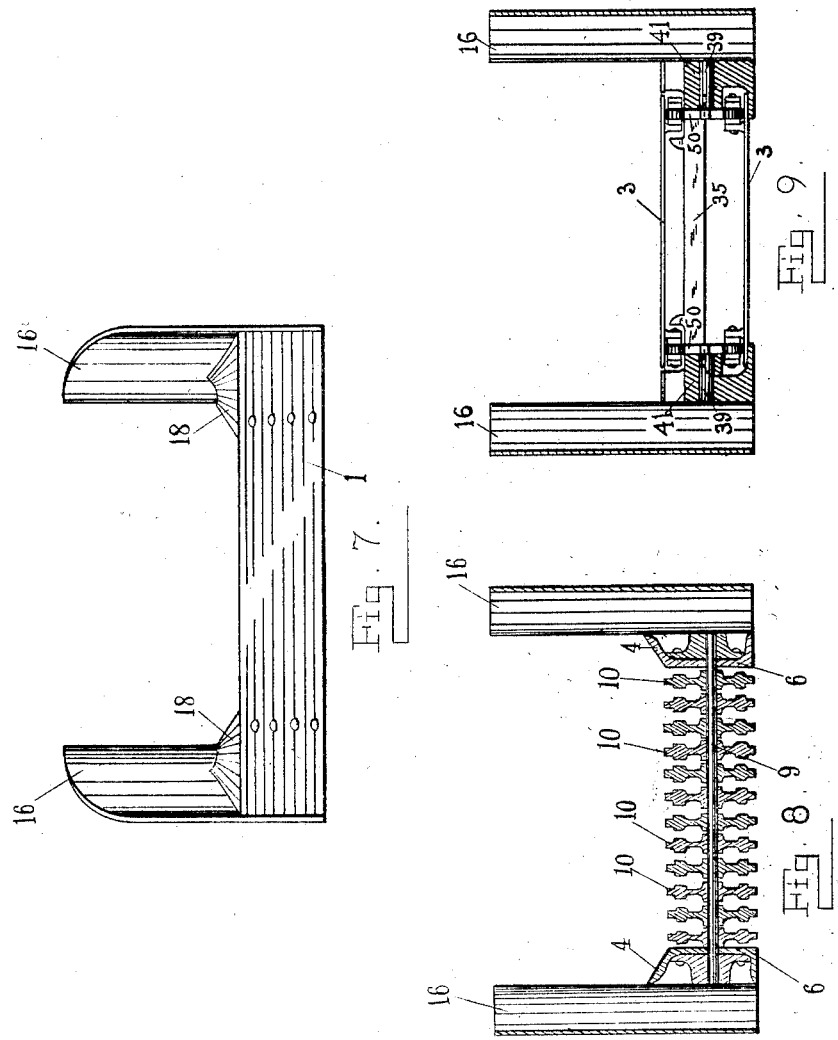

No. 856,980. PATENTED JUNE 11, 1907.
G. F. MYERS.
COKE WORKING APPARATUS.
APPLICATION FILED JULY 23, 1903.
9 SHEETS—SHEET 6.
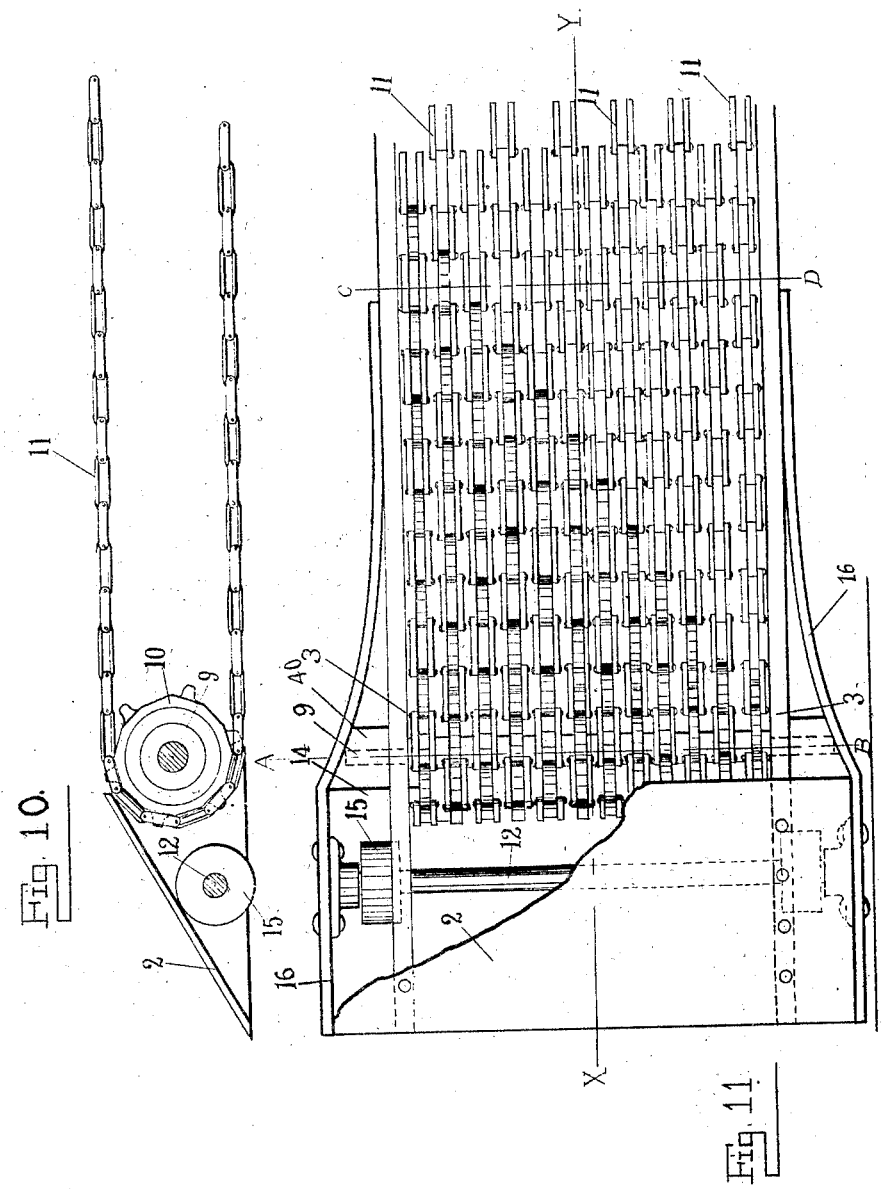
WITNESSES
INVENTOR
George Francis Myers No. 856,980. PATENTED JUNE 11, 1907.
G. F. MYERS.
COKE WORKING APPARATUS.
APPLICATION FILED JULY 23, 1903.
9 SHEETS—SHEET 7.
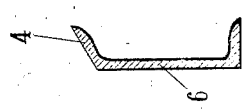
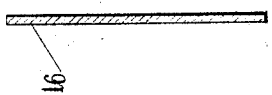
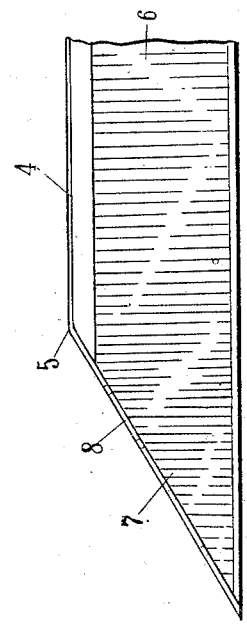
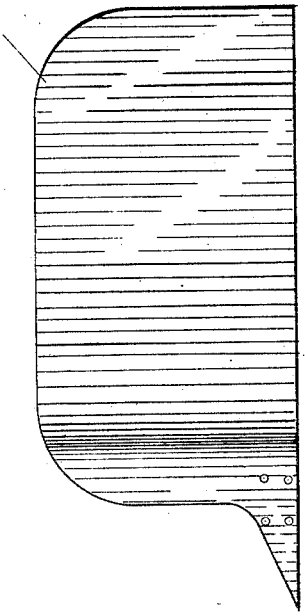
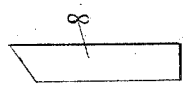
WITNESSES
B. E. Lyng
S. B. Miller
INVENTOR
George Francis Myers

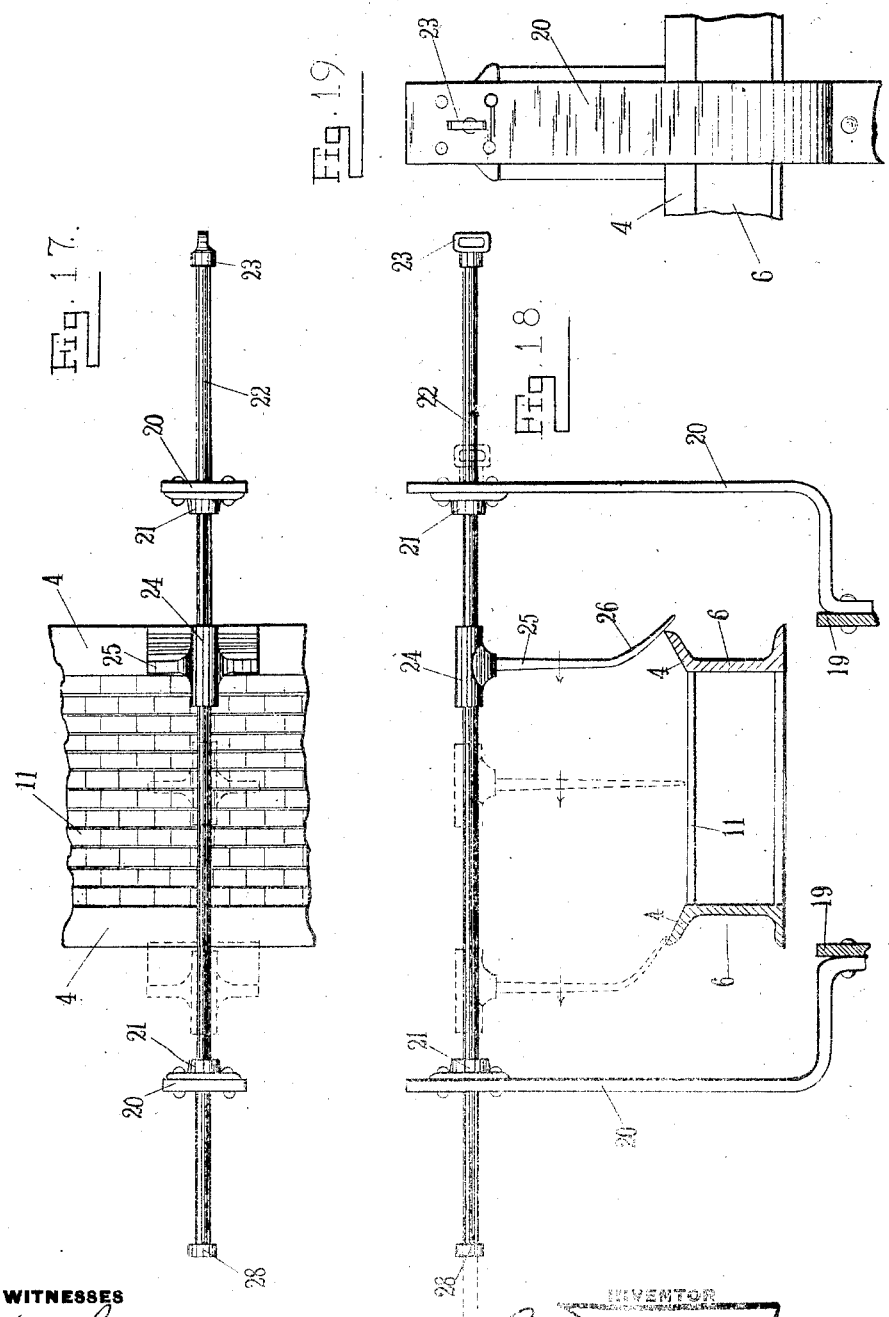

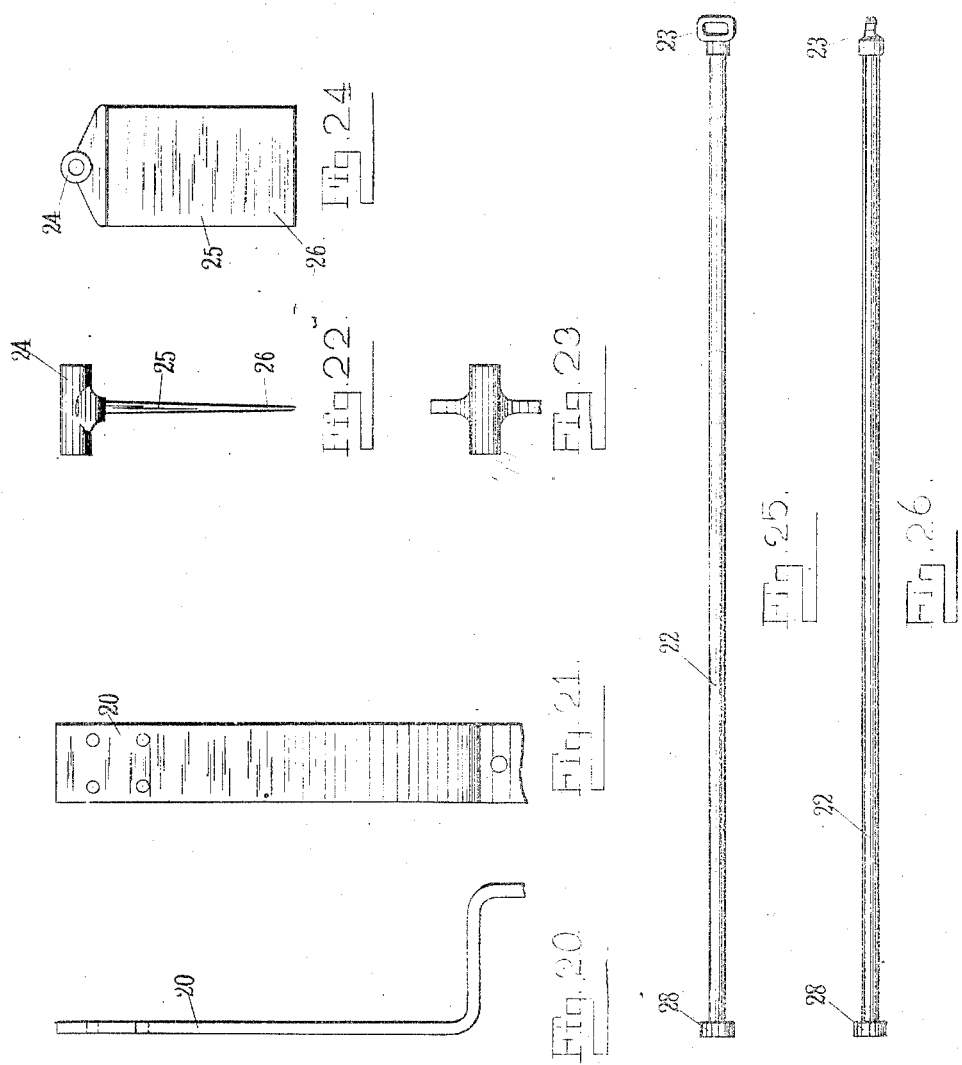

UNITED STATES PATENT OFFICE.

GEORGE FRANCIS MYERS, OF COLUMBUS, OHIO, ASSIGNOR TO JOHN C. PENNIE, OF MONTCLAIR, NEW JERSEY.

COKE-WORKING APPARATUS.

No. 856,980.　　　　Specification of Letters Patent.　　　Patented June 11, 1907.

Application filed July 23, 1903. Serial No. 166,652.

*To all whom it may concern:*

Be it known that I, GEORGE FRANCIS MYERS, a citizen of the United States, residing at Columbus, in the county of Franklin and State of Ohio, have invented a certain new and useful Improvement in Coke-Working Apparatus, of which the following is a specification.

This invention relates to certain new and useful improvements in coke working machines.

It comprises certain new and useful improvements for breaking down the coke and withdrawing the same from the oven.

Figure 3:
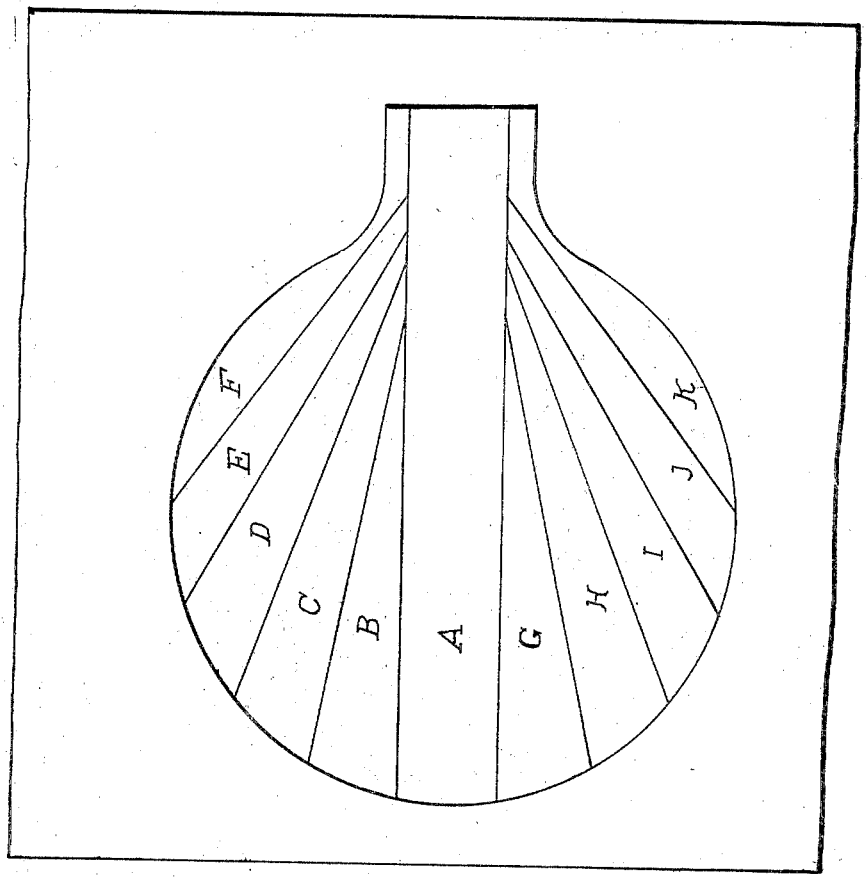
Figure 4:
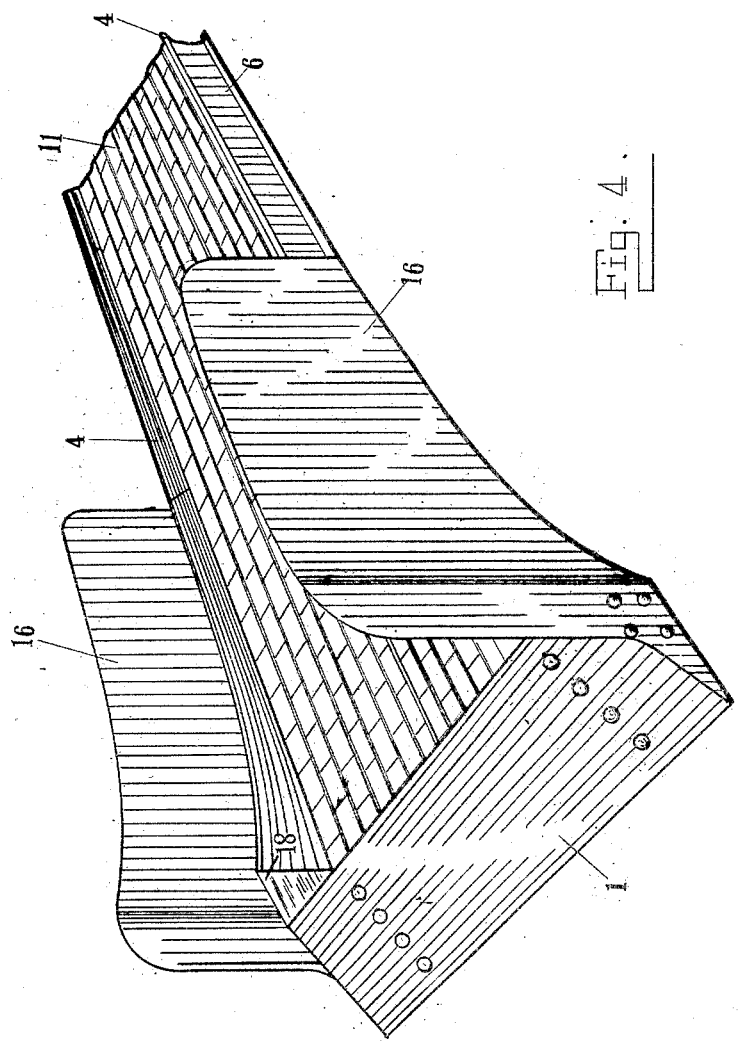

Figure 1 is a plan view of my invention, the oven being partly in horizontal section. Fig. 2 is a side elevation of my invention, the oven being partly in cross-section. Fig. 3 is an enlarged plan view of the bottom of one of the ovens showing the method of attack upon the coke. Fig. 4 is a perspective view of the breaking-down tool and the forward end of the insertible conveyer. Fig. 5 is a plan view of the breaking-down tool conveyer and the breaking down tool. Fig. 6 is a side elevation of the above. Fig. 7 is a front elevation of the same. Fig. 8 is a transverse section along the line A—B of Fig. 11, the frame work being built up of structural material. Fig. 9 is also a transverse section along the line A—B of Fig. 11, the frame work being of cast steel. Fig. 10 is a longitudinal section along the line X—Y in Fig. 11. Fig. 11 is a plan view of the forward part of the apparatus with part of the top plate broken away. Figs. 12 to 14 are details of the forward end of the side of the frame work. Figs. 15 and 16 are details of the side guide. Figs. 17 to 19 are, respectively, a plan, side and end elevation of the coke remover. Figs. 20 to 26 are details thereof.

Referring to the drawings, 1 is a wedge, built up of the plate 2 which is fastened to the frame work or channels 6. These channels, 6, run to the rear of the machine, and at the forward end have the upper flange 4 bent downward as indicated at 5, the web being cut here also at an angle, 7, and the flange bent over the same as shown at 8, the plate 2 being fastened to this bent-over portion of the flange. Journaled in said web 6 at 40 is the shaft 9, which carries a plurality of sprocket wheels 10, each of these sprocket wheels 10 having a chain, 11, rolling over the same. I preferably bring the forward edges of said chains 11 underneath the plate 2, as seen more particularly in Figs. 10 and 11 so that no small pieces of coke can get between the wedge 1 and the chains. A second shaft 2 is journaled in the upright sides or guides 16 of the wedge 1, said sides 16 being preferably at some distance from the side of the webs of the channels 6, making an off-set 14 to the said channels. On said shaft 12 are fastened rollers 15. These rollers, as shown in Fig. 10, lie below the lower end of the wedge 1 so that the said wedge will not strike the oven floor.

Fastened to the sides of the wedge 1 are the upright sides or guides 16; these sides embrace the wedge 1 and the off-set portion 14, or space between said upright sides 16 and the back of the wedge 1, which is filled in by the triangular piece 18, which may be level if desired. These sides 16 may be used to guide the coke onto the conveyer 11 as it is broken down by the wedge 1.

Outside the oven, and preferably attached to the chute 19, are the upright pieces 20 having bearings 21; through these bearings 21 slides the rod 22 operated by means of the handle 23; between said guides 20, and attached to the said rod 22, is the sleeve 24, having fastened to one part thereof the scraper 25, which is made flexible at its lower part 26. This scraper 25 reciprocates back and forth and is moved over the conveyer chains 11 which constitute an endless carrier; any material being thereon will be pushed off to either side into the chute below.

I preferably bend up the upper flange 4, of the channel 6 as more particularly shown in Fig. 14. This turned-up flange then forms an angular side for the chains 11 and any material on said conveyer chains will be prevented from sliding off therefrom while moving out of the oven.

In Fig. 9 is illustrated a modification of the frame-work 6, made of a single casting 35 instead of channels, and in lieu of a plurality of sprocket wheel 10 and chains 11 there is shown an ordinary apron conveyer 3 with two sprocket wheels 50 having short shafts 39 in bearings 41. The wedge 1 may be cast solid with the piece 35 if desired. An electric motor 42 may drive the conveyer chain 11 or 3. A crank 41 is fastened to a pinion 43 which meshes into the rack 44 riveted to the channels 6 of cast integral with the casting 35, and moves the wedge 1 into and out of the oven. Another crank 48 is attached to the worm 45 in bearings 46 cast on the main frame 29 and meshing into the worm wheel on the collar 47 by means of which the wedge may be moved in the arc of a circle. By manipulating said cranks 41 and 48 the wedge may be guided to any part of the oven floor.

Although the apparatus may be inserted in any manner into the oven, that is it may be made to break down the coke here, there and elsewhere, without any preconcerted action, yet I prefer to attack the coke, as more particularly shown in Fig. 3. I first cut the "tight" A then move back the wedge 1 and proceed to consecutively cut out the portion B, then C, D, E, and F; then turning to the left I respectively cut G, H, I, J, and K.

The operation of this apparatus is substantially as follows: The conveyer being started by the motor 42, it, with the wedge 1, is forced into the oven by turning the crank 41 with its pinion 43 over the rack 44; as it proceeds the wedge 1 will wedge up the coke in the oven and cause the coke to slide up over the top of the wedge 1 where it will be caught by the moving chains 11 and carried directly to the rear of the apparatus. As soon as a piece of coke reaches the outside of the door, the scraper head 25 is moved across the chains 11 by the rod 22 and will push the coke off the conveyer into the chute 19 whence it will fall into the conveyer 50 and be carried away. The crank 41 now being reversed the conveyer will be pulled out of the oven. This process may be repeated until all the coke is withdrawn from the oven. On account of the off-set portion 14, that is because the wedge 1 is wider than the conveyer (see Figs. 1 and 5) the wedge will be able to get into the corners of the oven.

I do not limit myself to the construction as shown, nor to the working of the feed mechanism by hand as power may be applied if desired. Also the same motive power that drives the conveyer 11 may be used to feed the same. Other means than the reciprocating scraper head 25 may be used to remove the coke from the conveyer.

Having described my invention, I claim:

1. Apparatus for breaking down and withdrawing coke from a coke oven, comprising a wedge adapted to wedge up the coke, an endless carrier receiving the wedged-up coke from the wedge and conveying it from the oven, and means for projecting the wedge and carrier into the oven.

2. Apparatus for breaking down and withdrawing coke from a coke oven, comprising a frame carrying at its forward end a rigid wedge, and carrying a conveyer at the rear of said wedge, and means for projecting the wedge and conveyer into the oven.

3. Apparatus for breaking down and withdrawing coke from a coke oven, comprising a wedge adapted to wedge up the coke, a conveyer receiving the wedged-up coke from the wedge, means for projecting the wedge and conveyer into the oven, and means for swinging the wedge and conveyer into different paths of movement.

4. In apparatus for breaking down and withdrawing coke from a coke oven, the combination with a receiving conveyer, of a breaking-down wedge provided with upright side guides for directing the falling coke upon the conveyer, and means for projecting the conveyer and wedge into the oven.

5. In apparatus for breaking down and withdrawing coke from a coke oven, the combination with a receiving conveyer, of a breaking-down wedge provided with upright side guides for directing the falling coke upon the conveyer, said side guides also extending rearwardly along opposite sides of the conveyer, and means for projecting the conveyer and wedge into the oven.

6. In apparatus for breaking down and withdrawing coke from a coke oven, the combination with a receiving conveyer, of a wedge located in front of and of greater width than the conveyer, upright side guides having an inward curve at the junction of the wedge and conveyer, floor plates filling in the spaces between said curves and the side edges of the conveyer, and means for projecting the conveyer and wedge into the oven.

7. In apparatus for breaking down and withdrawing coke from a coke oven, a conveyer, means for projecting said conveyer into an oven, and a rigid wedge attached to the side frames of the conveyer, said side frames being cut down at their forward edges to conform to the shape of the wedge.

8. In apparatus for breaking down and withdrawing coke from a coke oven, the combination with a conveyer, means for inserting said conveyer into the oven, said conveyer being adapted to carry coke from the inside of the oven to the outside thereof, and means for discharging the coke laterally from the conveyer before it reaches the farther end of the conveyer.

9. In apparatus for breaking down and withdrawing coke from a coke oven, the combination with a conveyer, means for inserting said conveyer into the oven, said conveyer being adapted to carry coke from the inside of the oven to the outside thereof, and means for discharging the coke laterally from the conveyer before it reaches the farther end of the conveyer, said means being located outside of the oven.

10. In apparatus for breaking down and withdrawing coke from a coke oven, the combination with a conveyer, means for inserting said conveyer into the oven, said conveyer being adapted to carry coke from the inside of the oven to the outside thereof, and means for discharging the coke laterally from the conveyer before it reaches the farther end of the conveyer, said means being located outside of the oven and consisting of a scraper arranged to reciprocate transversely of said conveyer.

11. In apparatus for breaking down and withdrawing coke from a coke oven, the combination with a wedge adapted to wedge up the coke, of an endless carrier consisting of a plurality of chains arranged in longitudinal parallelism and adapted to receive the coke wedged up by the wedge, and means for projecting the wedge and chains into the oven.

GEORGE FRANCIS MYERS.

In the presence of—
  S. B. MILLER,
  J. C. MARTIN.